US005119087A

United States Patent [19]

Lucas

[11] Patent Number: 5,119,087

[45] Date of Patent: Jun. 2, 1992

[54] SHOPPING CART RETRIEVAL SYSTEM WITH AWARD SIGNAL GENERATION BASED ON A PREDETERMINED COUNT

[76] Inventor: J. Hendren Lucas, 6767 Sharpe Rd., Fowlerville, Mich. 48836

[21] Appl. No.: 596,557

[22] Filed: Oct. 10, 1990

Related U.S. Application Data

[63] Continuation of Ser. No. 354,764, May 22, 1989, abandoned.

[51] Int. Cl.[5] ..................... H04B 10/00; G07F 11/00

[52] U.S. Cl. .............................. 340/825.35; 194/211; 194/213; 194/905

[58] Field of Search .................. 340/825.35, 933, 941, 340/942, 943; 194/211, 213, 905; 186/62, 63, 64, 65

[56] References Cited

U.S. PATENT DOCUMENTS

| | | | |
|---|---|---|---|
| 3,176,267 | 3/1965 | Bolton | 340/932.2 |
| 3,441,719 | 4/1969 | Haller et al. | 377/6 |
| 3,882,982 | 5/1975 | Smith | 194/211 |
| 4,424,893 | 1/1984 | Gillet | 194/905 |
| 4,470,495 | 9/1984 | Unger | 194/905 |
| 4,549,182 | 10/1985 | Gillet | 194/905 |
| 4,572,347 | 2/1986 | Eisermann | 194/905 |
| 4,576,274 | 3/1986 | Thorsen | 194/905 |
| 4,868,544 | 9/1989 | Havens | 194/905 |

FOREIGN PATENT DOCUMENTS

| | | | |
|---|---|---|---|
| 85/00961 | 5/1985 | World Int. Prop. O. | 194/905 |

*Primary Examiner*—Donald J. Yusko
*Assistant Examiner*—Dervis Magistre
*Attorney, Agent, or Firm*—Dinnin & Dunn

[57] ABSTRACT

A system for retrieving shopping carts at a store having a plurality of shopping carts is disclosed. The system includes a counter which can be preset to a first determined count. A target is mounted to each shopping cart while a sensor detects the return of each shopping cart to a designated area. As each shopping cart is returned to the designated area, the sensor generates an output pulse which changes the count in the counter. Whenever the count in the counter achieves a second predetermined count, an alarm is activated indicative that a prize is awarded to the person returning the shopping cart to the designated area.

12 Claims, 1 Drawing Sheet

SHOPPING CART RETRIEVAL SYSTEM WITH AWARD SIGNAL GENERATION BASED ON A PREDETERMINED COUNT

This is a continuation of U.S. patent application Ser. No. 07/354,764, filed May 22, 1989, now abandoned.

BACKGROUND OF THE INVENTION

I. Field of the Invention

The present invention relates generally to a system for encouraging people to return shopping carts to a predetermined designated area.

II. Description of the Prior Art

Many stores, especially grocery stores, have a plurality of shopping carts which are used to carry goods purchased from the store by the customers to the customers' vehicles. After the goods or groceries are unloaded from the carts, the customer typically leaves the shopping cart in the parking lot area. This is disadvantageous in a number of different respects.

One problem created by shoppers who simply leave the shopping carts in the middle of the parking lot is that the store must hire personnel to periodically retrieve its shopping carts from the parking lot and return them to the desired shopping cart area. This results in high labor costs for the store.

A still further disadvantage of shopping carts in the parking lot area is that the shopping carts can strike and damage cars and other vehicles in the parking lot. Such damage to the customer vehicles not only results in ill will towards the store, but can also result in financial claims made by customers against the store in order to repair the vehicle damage.

A still further disadvantage of shopping carts left in the parking lot by customers is that a relatively high percentage of the shopping carts are oftentimes in the parking lot. Consequently, it is necessary for the store to purchase additional shopping carts in order to have sufficient shopping carts available at all times for use by customers in the store. Shopping carts are expensive and this results in an additional equipment cost for the store.

SUMMARY OF THE PRESENT INVENTION

The present invention provides a system which, in operation, encourages shoppers to return the shopping cart from the parking lot and to a predesignated area thereby overcoming the above mentioned disadvantages.

In brief, the system of the present invention comprises a counter which is preset to a predetermined count. The predetermined count, however, can be varied, if desired, by the store.

A sensor is located adjacent the shopping cart return area. This sensor cooperates with a target mounted to each shopping cart so that, whenever a shopping cart is returned to the shopping cart area, the sensor generates an output pulse. The output pulse from the sensor is coupled as an input signal to the counter and varies the count in the counter by a predetermined increment or decrement whenever a shopping cart is returned to the shopping cart area.

A detector circuit is coupled to the output from the counter which detects whenever the count in the counter reaches a second predetermined count. Whenever this second predetermined count is reached, the detector generates an output signal which activates an alarm.

The activation of the alarm at the shopping cart return area may be of any conventional audio and/or visual alarm. Whenever the alarm is activated, a prize is awarded to the person returning the shopping cart thereby providing an inducement for shoppers to return the shopping carts to the shopping cart return area.

After activation of the alarm, the counter is reset and the above process is repeated.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
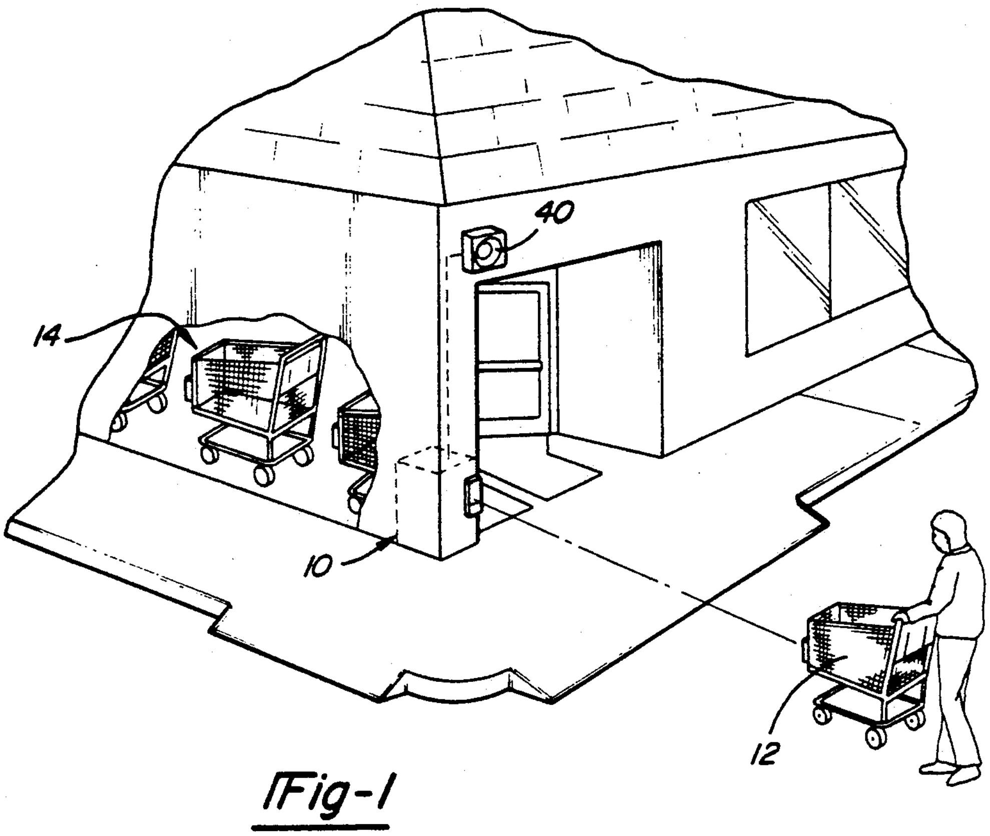
FIG. 1 is a perspective view illustrating a preferred embodiment of the present invention.

With reference first to FIG. 1, a preferred embodiment of the system 10 of the present invention is thereshown for use with a store having a plurality of shopping carts 12 and a designated shopping cart return area 14. The system 10 is located adjacent the shopping cart return area 14 so that, as each shopping cart 12 is returned from a parking lot to the return area 14, the shopping cart 12 passes by the system 10.

Figure 2:
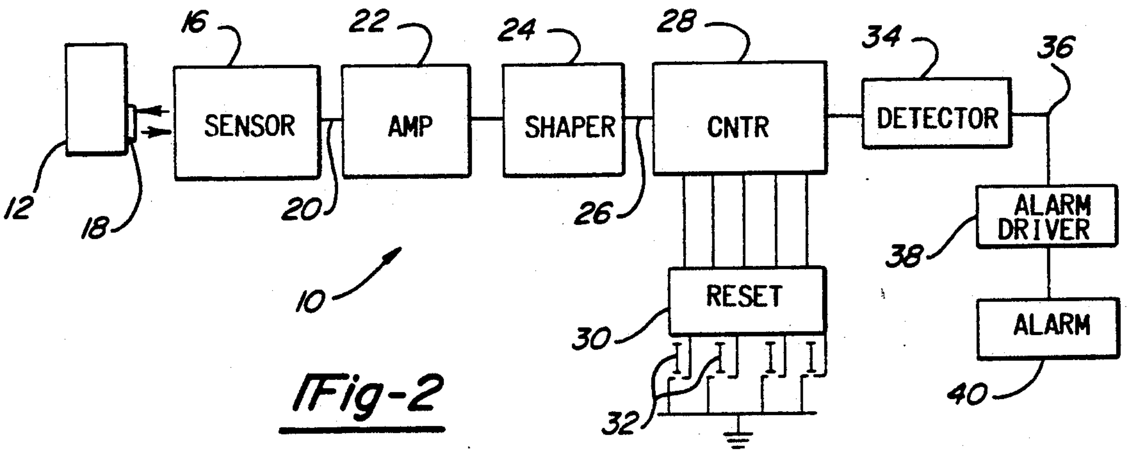
FIG. 2 is a schematic view illustrating the preferred embodiment of the present invention.

Referring now to FIGS. 1 and 2, the system 10 of the present invention comprises a sensor 16 which cooperates with a target 18 mounted to each shopping cart 12 so that the sensor 16 generates an output signal on its output 20 whenever the shopping cart 12 passes the sensor 16 as the shopping cart 12 is returned from the parking lot and to the return area 14. The sensor 16 and target 18 can be of any conventional construction, such as a magnetic target 18 and sensor 16, optical targets, or the like, so that a further description thereof is unnecessary.

The output signal from the sensor 16 is fed as an input signal to an amplifier 22 and then through a wave shaper 24 which produces an output signal on its output 26 corresponding to an output signal from the sensor 16. The output 26 from the wave shaper 24 is fed as an input signal to a counter 28.

A reset circuit 30 is coupled to the counter 28 so that, upon activation of the reset circuit 30, the counter 28 is preset to a predetermined count. Switches 32 on the reset circuit 30, however, can vary the initial count in the counter 28. After the counter 28 has been preset to its predetermined count, each pulse along the line 26 will change the count in the counter 28 by one count. Additionally, the counter 28 is preferably a down counter so that the count in the counter 28 is decremented for each pulse on the output line 26.

A detector circuit 34 is coupled to the counter 28 so that whenever the count in the counter 28 achieves a second predetermined count, for example a zero count, the detector generates an output signal on its output line 36. This output signal is fed as an input signal to an alarm driver circuit 38 which activates an alarm 40 in the system housing 11. The alarm 40 can be either audio, visual, or a combination of the two.

In operation, the counter 28 is preset to a predetermined, but user selectable, amount. Thereafter, the count in the counter is changed by one each time a shopping cart 12 is returned from the parking lot to the shopping cart return area 14 in the fashion previously described. Whenever the count in the counter 28 reaches the second predetermined amount, the alarm 40 is activated and a prize is awarded to the person returning the shopping cart to the return area 14. This prize can be of any sort, such as money, gifts, double coupons, or the like.

A primary advantage of the system of the present invention is that it encourages and induces customers to return the shopping carts from the parking lot and to the return area 14. These customers can be persons who have used the shopping cart 12 to carry goods from the store to their vehicles or customers who, upon arriving and parking in the parking lot, return a shopping cart 12 that has been left there by a prior customer. In either event, the shopping carts 12 are rapidly returned to the return area 14 in the desired fashion.

Having described my invention, however, many modifications thereto will become apparent to those skilled in the art to which it pertains without deviation from the spirit of the invention as defined by the scope of the appended claims.

I claim:

1. For use with a store having a plurality of shopping carts, a system for encouraging people to return the shopping carts to a designated area comprising:

a target attached to each of a plurality of shopping carts;

a single counter, said single counter being operable between a first and second predetermined limit;

means coupled to said single counter for varying said first predetermined limit and presetting said single counter to said first predetermined limit, said first predetermined limit being a user selected limit;

means for detecting said target on each shopping cart when returned to the designated area and for generating an output signal representative thereof;

means interconnecting said single counter and said detecting means and responsive to said output signal for changing the count in said single counter by a predetermined increment toward said second predetermined limit;

means connected to said single counter for detecting when the count in said single counter reaches said second predetermined limit and for generating a detector output signal whenever said count in said single counter reaches said second predetermined limit;

an award signal generating means; and means interconnecting said detecting and generating means and said award signal generating means and responsive to said detector output signal for activating said award signal generating means, whereby the last one of a predetermined count of shopping carts returned to the designated area activates the award signal generating means.

2. The system as defined in claim 1 wherein said single counter is a down counter which is decremented for each output signal and wherein said second predetermined count is zero.

3. The system as defined in claim 1 wherein said detecting means comprises a sensor at said designated area, said target activating said sensor when said target and sensor are brought in to close proximity with each other.

4. A shopping cart retrieval system for encouraging the return of shopping carts to a designated area, comprising:

a target mounted to each of a plurality of shopping carts;

means for sensing said target on each of the plurality of shopping carts returned to the designated area and for generating an output signal for each said target sensed;

a single counter connected to said sensing means for counting each said output signal from said sensing means;

means coupled to said single counter for presetting said single counter to a first and second predetermined count;

means connected to said single counter for detecting said single counter reaching said second predetermined count;

an alarm;

means interconnecting said alarm and said detecting means for activating said alarm in response to said detecting means detecting said second predetermined count, whereby the last one of a predetermined count of shopping carts returned to the designated area activates the alarm.

5. A system as set forth in claim 4 wherein said sensing means comprises a sensor located adjacent the designated area.

6. A system as set forth in claim 5 wherein said presetting means comprises a reset circuit connected to said single counter.

7. A system as set forth in claim 6 including means for varying said first predetermined count.

8. A system as set forth in claim 7 wherein said detecting means comprises a detector circuit connected to said single counter to generate a signal in response to said single counter reaching said second predetermined count.

9. A system as set forth in claim 8 wherein said activating means comprises an alarm driver circuit connected to said detector circuit to receive said signal from said detector circuit.

10. A system as set forth in claim 9 including an amplifier connected to said sensor for amplifying said output signal.

11. A system as set forth in claim 10 including a wave shaper interconnecting said amplifier and said single counter.

12. A shopping cart retrieval system, comprising:

a plurality of shopping carts;

a target mounted to each of said plurality of shopping carts;

a sensor located adjacent a designated area to sense said target of each of said plurality of shopping carts passing thereby when returned to the designated area and generating an output signal in response thereto;

an amplifier connected to said sensor for amplifying said output signal;

a wave shaper connected to said amplifier receiving a signal from said amplifier;

a single counter connected to said wave shaper for counting each said signal from said wave shaper;

a reset circuit connected to said single counter to preset said single counter to a first predetermined count;

a plurality of switches on said reset circuit to vary said first predetermined count on said single counter;

a detector circuit connected to said single counter to generate a signal in response to said single counter reaching a second predetermined count;

an alarm driver circuit connected to said detector circuit to receive said signal from said detector circuit; and an alarm which is activated by said alarm driver circuit, whereby the last one of a predetermined count of shopping carts returned to the designated area activates the alarm.

* * * * *